(12) United States Patent
Harris et al.

(10) Patent No.: US 11,725,465 B2
(45) Date of Patent: Aug. 15, 2023

(54) OPTICAL GAS SENSOR ASSEMBLY

(71) Applicant: Baker Hughes Oilfield Operations LLC, Houston, TX (US)

(72) Inventors: Neil Geoffrey Harris, Farnborough (GB); James David Ratcliffe, Farnborough (GB); Timothy Michael Gill, Farnborough (GB); Enrico Fiori, Houston, TX (US); Christopher Hamblin, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 585 days.

(21) Appl. No.: 16/721,489

(22) Filed: Dec. 19, 2019

(65) Prior Publication Data
US 2020/0200006 A1 Jun. 25, 2020

Related U.S. Application Data

(60) Provisional application No. 62/783,450, filed on Dec. 21, 2018.

(51) Int. Cl.
*E21B 17/10* (2006.01)
*G01V 8/02* (2006.01)
(Continued)

(52) U.S. Cl.
CPC .......... *E21B 17/1014* (2013.01); *E21B 47/01* (2013.01); *E21B 47/114* (2020.05);
(Continued)

(58) Field of Classification Search
CPC ...... E21B 49/08; E21B 49/10; E21B 17/1014; E21B 17/1021; E21B 47/01;
(Continued)

(56) References Cited

U.S. PATENT DOCUMENTS 3,740,155 A * 6/1973 Keller ................ G01N 21/8507
356/418
4,764,677 A 8/1988 Spurney
(Continued)

FOREIGN PATENT DOCUMENTS

CN 201763322 U * 3/2011
CN 201763322 U 3/2011
(Continued)

OTHER PUBLICATIONS

International Search Report and Written Opinion dated Mar. 10, 2020 in International Application No. PCT/US19/68049.

*Primary Examiner* — George S Gray
(74) *Attorney, Agent, or Firm* — Hogan Lovells US LLP

(57) ABSTRACT

A sensor device includes a tubular body having a first end and a second end opposite the first end, a pressure plug on the first end of the tubular body, and a sensor tip on the second end of the tubular body, wherein the sensor tip comprises an open end opposite the tubular body and an optical tip removably positioned through the open end and held in place by a removable cap. The optical tip includes an optical rod and a rod holder. The sensor device further includes an optical fiber extending from the pressure plug, through the tubular body, and into the sensor tip where the optical fiber is optically coupled to the optical rod. The pressure plug may include a slack cavity where the optical fiber is in slack under neutral temperature and pressure conditions to withstand expansion of the sensor device under high temperature or pressure conditions.

20 Claims, 4 Drawing Sheets

(51) Int. Cl.
  *E21B 47/01* (2012.01)
  *E21B 47/113* (2012.01)
  *E21B 47/135* (2012.01)
  *G01V 8/16* (2006.01)
  *G01V 8/10* (2006.01)

(52) U.S. Cl.
  CPC .............. *E21B 47/135* (2020.05); *G01V 8/02* (2013.01); *G01V 8/10* (2013.01); *G01V 8/16* (2013.01)

(58) Field of Classification Search
  CPC .... E21B 47/114; E21B 47/135; E21B 47/013; E21B 47/10; E21B 47/113; G01N 21/00; G01N 21/41; G01N 21/55; G02B 6/3846; G01V 8/02; G01V 8/16; G01V 8/10; G01V 11/005
  See application file for complete search history.

(56) References Cited

U.S. PATENT DOCUMENTS

| | | |
|---|---|---|
| 5,956,132 A | 9/1999 | Donzier |
| 6,704,109 B2 | 3/2004 | Wu |
| 7,142,306 B2 | 11/2006 | Wu |
| 7,542,142 B2 | 6/2009 | Wu |
| 2013/0258319 A1 | 10/2013 | Schleicher |
| 2017/0198574 A1* | 7/2017 | Donzier .................. E21B 49/08 |
| 2017/0219737 A1* | 8/2017 | Donzier .................. E21B 49/08 |
| 2017/0363830 A1* | 12/2017 | Park ..................... G02B 6/4454 |

FOREIGN PATENT DOCUMENTS

| | | |
|---|---|---|
| EP | 0435623 | 7/1991 |
| EP | 0508894 | 10/1992 |
| EP | 3190400 A1 | 7/2017 |
| EP | 3199942 A1 | 8/2017 |
| WO | 2016137489 A1 | 9/2016 |

* cited by examiner

OPTICAL GAS SENSOR ASSEMBLY

CROSS REFERENCE TO RELATED APPLICATIONS

This application claims priority to U.S. Patent Application No. 62/783,450 filed Dec. 21, 2018 titled "OPTICAL GAS SENSOR ASSEMBLY", the disclosure of which is incorporated herein by reference in its entirety.

BACKGROUND

1. Field of Invention

This invention relates in general to equipment used in the hydrocarbon industry, and in particular, to a tool for measurement of downhole fluid properties.

2. Description of the Prior Art

In mixed phase oil/gas wells, it is often desirable to know the relative percentages of gas, oil and water at any one point in the well. This is particularly important in non-vertical or deviated wells, where the fluids tend to form layers along the wellbore and the composition of these layers becomes vital for optimizing the production of hydrocarbons from the well. Typical approaches to identifying the fluids have used capacitance and resistivity sensors to distinguish between the three fluids. Resistivity methods are used for detecting water, as water is significantly more conductive than oil or gas. However, capacitance methods are not very accurate for determining oil with respect to gas. An optical method using the refractive index of the fluids is relatively new technology in the field of downhole tools. While it is very efficient at distinguishing gas from oil, the sensors tend to be very fragile and lack robustness to well conditions and mechanical abuse.

BRIEF DESCRIPTION OF THE DRAWINGS

Various embodiments in accordance with the present disclosure will be described with reference to the drawings, in which.

SUMMARY

Figure 1:
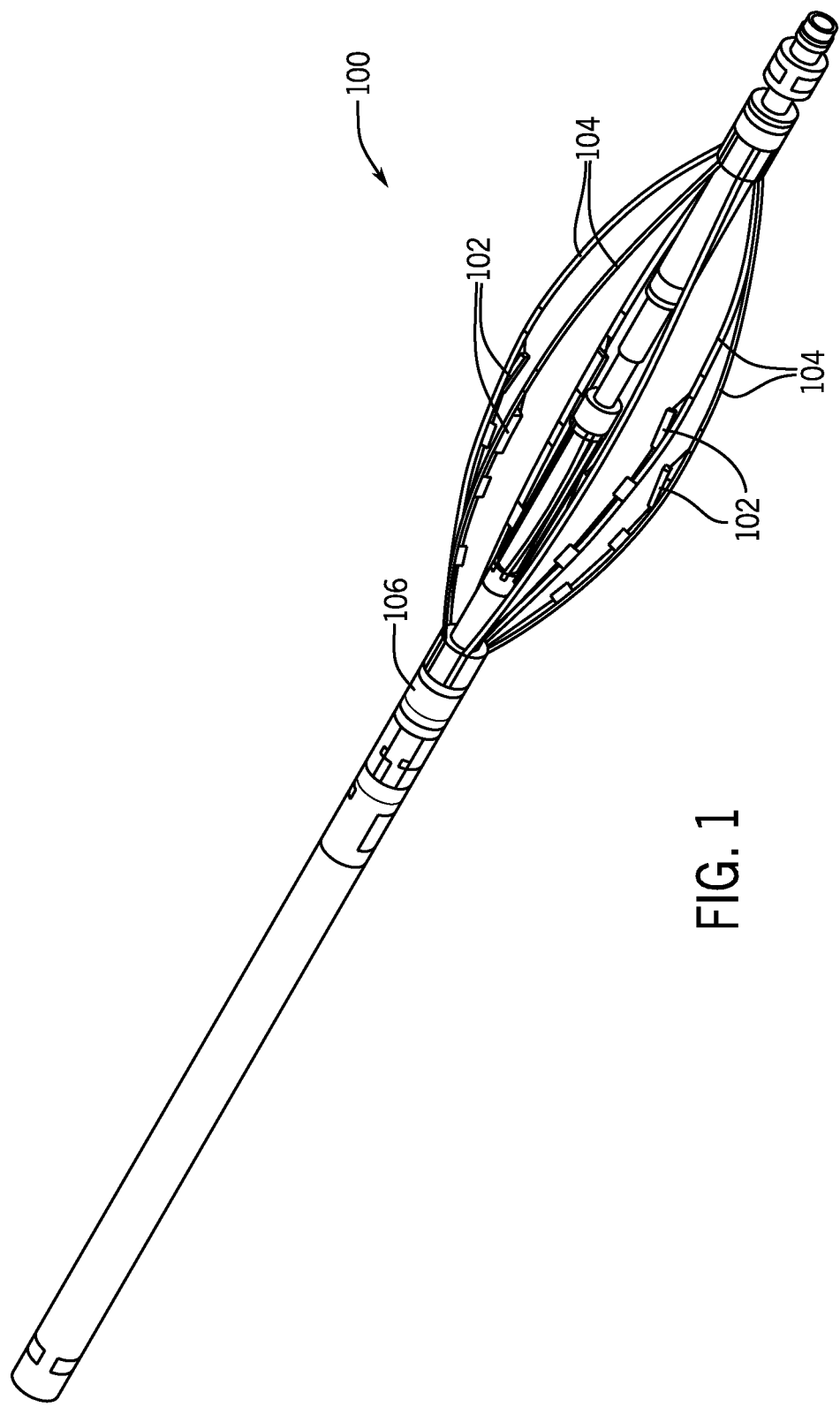
FIG. 1 illustrates a perspective view of such a downhole optical logging tool 100, in accordance with example embodiments.

In an embodiment, a downhole logging tool includes a tool body, a bulk head on the tool body, a plurality of arms radially expandable from the tool body, and a plurality of sensor assemblies respectively coupled to and movable with the plurality of arms. An individual sensor assembly of the plurality of sensor assemblies includes a tubular body having a first end and a second end opposite the first end, a pressure plug coupled to the first end of the tubular body, wherein the pressure plug is coupled to the bulk head. The sensor assembly further includes a sensor tip coupled to the second end of the tubular body. The sensor tip includes an open end opposite the tubular body and an optical tip removably positioned through the open end and held in place by a removable cap. The optical tip includes an optical rod and a rod holder. The sensor assembly further includes an optical fiber extending from the pressure plug, through the tubular body, and into the sensor tip where the optical fiber is optically coupled to the optical rod. In some such embodiments, the tool body houses electronic components and the bulk head provides an interface between the electronic components internal to the tool body and the plurality of sensors external to the tool body. In some embodiments, the pressure plug is sealed against the bulk head to isolate the inside of the tool body from an environment external to the tool body. In some embodiments, the electronic components include a light source and a detector in optical communication with the optical fiber and optical rod in the sensor assembly.

In another embodiment, a sensor device includes a tubular body having a first end and a second end opposite the first end, a pressure plug on the first end of the tubular body, and a sensor tip on the second end of the tubular body, wherein the sensor tip comprises an open end opposite the tubular body and an optical tip removably positioned through the open end and held in place by a removable cap. The optical tip includes an optical rod and a rod holder. The sensor device further includes an optical fiber extending from the pressure plug, through the tubular body, and into the sensor tip where the optical fiber is optically coupled to the optical rod. In some embodiments, the pressure plug includes a slack cavity where the optical fiber is in slack under neutral temperature and pressure conditions to withstand expansion of the sensor device under high temperature or pressure conditions. In some embodiments, an end of the optical fiber is held by a spring loaded ferule in the sensor tip, wherein the spring loaded ferule maintains the optical fiber in contact with the optical rod. In some embodiments, a sealing component between the optical tip and the opening of the sensor tip seals the inside of the sensor tip against an external environment. In some embodiments, the optical rod is permanently bonded to the rod holder. In some embodiments, the optical rod is removable from the rod holder. In some embodiments, the optical rod is a sapphire rod. In some embodiments, the optical rod extends beyond the rod holder and is optically coupled to an external environment.

In another embodiments, a method of changing an optical tip of a sensor assembly includes removing a cap of a sensor head of the sensor assembly, in which the optical tip is coupled to a tubular body opposite a pressure plug, removing an optical tip from an opening in the sensor head, inserting a new optical tip into the opening of the sensor head, in which the new optical tip includes an optical rod and a rod holder, and placing the cap back onto the sensor head over the new optical tip, the cap locking the new optical tip in place in the sensor head, in which at least a portion of the optical rod extends through the cap and is optically coupled to an environment external to the sensor assembly. In some embodiments, the method includes removing a damaged optical rod from the rod holder, and placing a new optical rod into the rod holder to form the new optical tip. In some embodiments, the optical tip includes an old optical rod permanently bonded to an old rod holder, both of which are replaced by the new optical tip.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

The system of the present technology provides a tool used to help identify the percentage of gas, water, and/or oil content present within a subterranean environment such as an oil or gas well. The tool may include one or more sensor devices that use optical methods and the refractive index of different well fluids (e.g., gas, water, oil) to determine the percentage of gas, compared to oil or water. A technical advantage over previous solutions is the significantly improved robustness and durability of the sensor, meaning less lost data and reduced running costs.

FIG. 1 illustrates a perspective view of such a downhole optical logging tool 100, in accordance with example embodiments. The tool 100 includes one or more sensors 102, such as those described in further detail below. Each of the sensors 102 is positioned on an exterior of the tool, at least when deployed, wherein the sensors 102 are exposed to well fluids. In some embodiments, the tool 100 includes a plurality of arms 104 which can expand radially outward depending on the size of the wellbore. The sensors 102 may be positioned on the arm 104 such as to be positioned away from each other and cover a large portion of a cross-section of the wellbore. In some cases, the fluid flow in the wellbore may be stratified (e.g., the fluid may not be completely uniform) and the plurality of sensors 102 in different positions can sample the fluid at different locations across the wellbore. For example, in a horizontal well, gas may accumulate near the top side of the horizontal wellbore. This may or may not be detected if only one sensor were present, but has a higher likelihood of being detected when there are multiple sensors 102 placed at different positions across a cross-section of the wellbore. The tool 100 may also include a sensor head portion 106, and each of the sensors may plug into the sensor head. The sensor head 106 acts as a bulk head between the electronics located inside the tool, which are at an ambient pressure, and the sensors 102, which are exposed to the downhole environment. In other words, the sensor head may act as a feedthrough to allow sensors 102 to plug into it and then communicate with electronics in the dry part of the tool 100.

Figure 2:
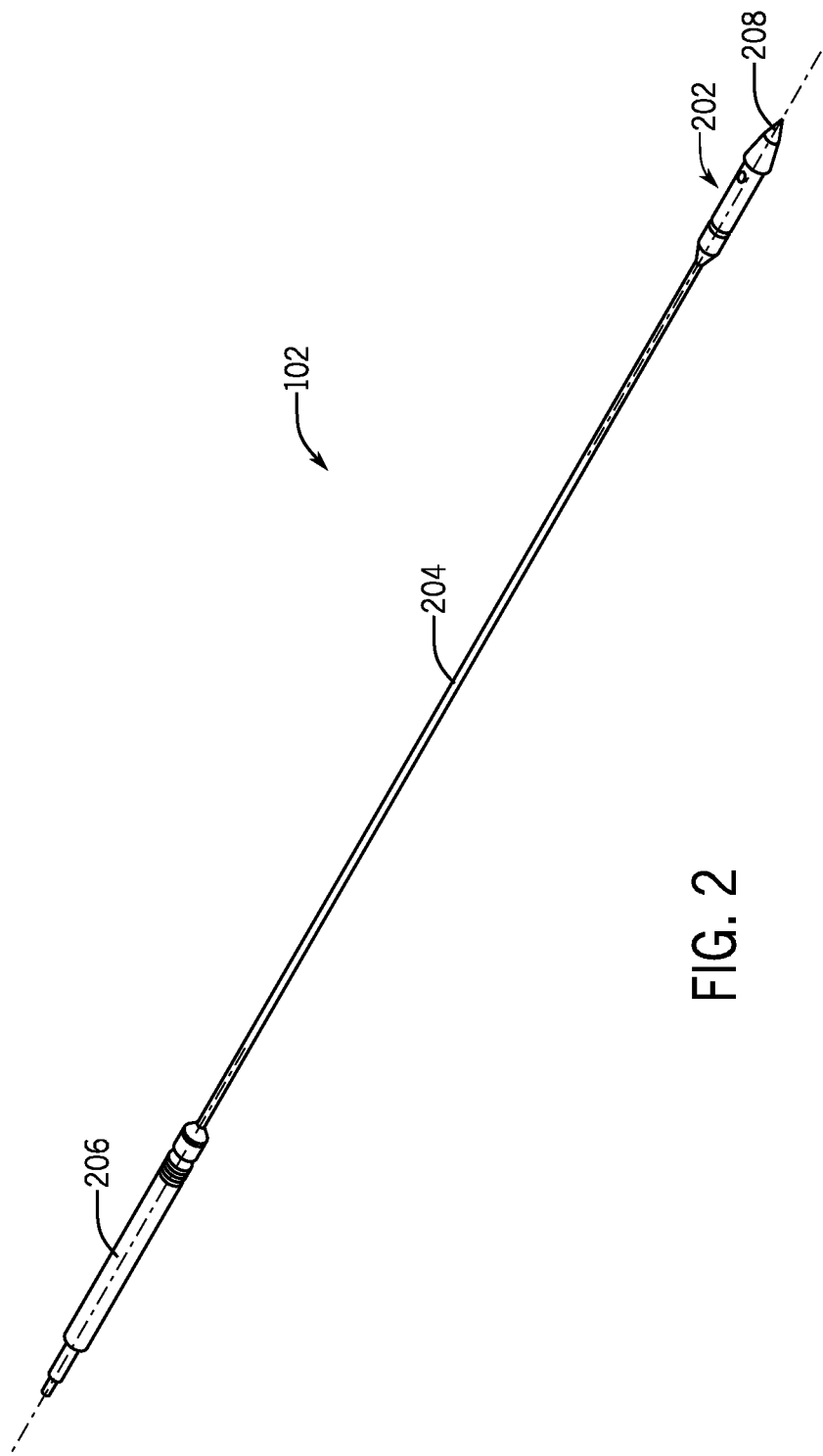
FIG. 2 illustrates an example embodiment of such an optical sensor, in accordance with example embodiments.

FIG. 2 illustrates an example embodiment of such a sensor 102, in accordance with one or more embodiments of the present disclosure. The sensor 102 assembly includes a tip assembly 202 at one end where the optical sensing occurs, a tubular body 204 connected to the tip assembly, and a pressure plug 206 at the other end of the tubular body 204. The tip assembly 202 includes a sapphire tip 208 which is exposed to an environment to be measured. The sapphire tip 208 is optically coupled to an optical fiber (e.g., glass fiber) which is inside and traverses the tubular body 204 and pressure plug 206. Thus, an optical channel is established through the sensor 102. The pressure plug 206 can plug into a tool body, which provides a light source for emitting light and a detector (e.g., photodiode) for detecting returning light. The sensor 102 allows the transmission of light to travel from the tool body to the tip 202 and back through one (the same) optical channel. When the sapphire rod 208 is exposed to gas, total internal reflection of the light transmitted into the sapphire rod 208 occurs and the receiver detects a high light return. When the sapphire rod 208 is immersed in oil or water, the light is refracted out of the rod 208 and the return signal is low. Thus, by analyzing the return light, it can be determined the presence and percentage of gas to oil and/or water. Conventional sensors are generally not capable of distinguishing gas from oil or water accurately and reliably. In some embodiments of the present disclosure, other types of optical material or shape can be used in place of the sapphire rod 208.

Figure 3:
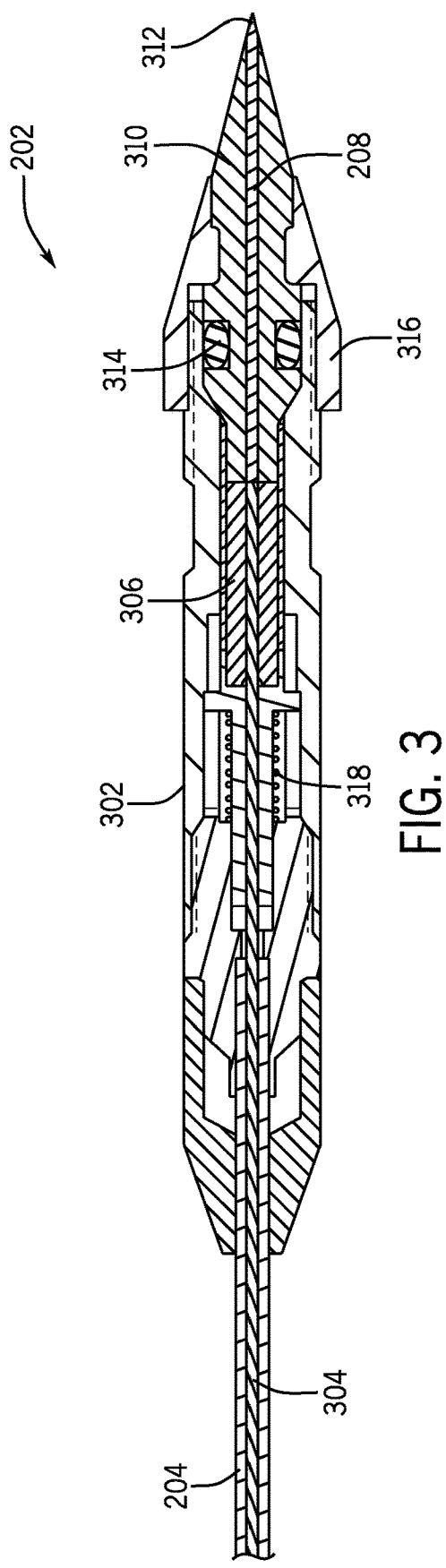
FIG. 3 illustrates a cross-sectional view of the tip assembly of the sensor, in accordance with example embodiments.

FIG. 3 illustrates a cross-sectional view of the tip assembly 202 of the sensor assembly 102, in accordance with example embodiments. The tip assembly 202 includes a pressure housing 302 which connects to the tubular body 204. An optical fiber 304 traverses a portion of the pressure housing 302 and stops within the pressure housing 302. In some embodiments, the optical fiber 304 is fixed within a ferrule 306 inside the chamber of the pressure housing 301 with the end 308 of the optical fiber 304 exposed (e.g., flush with an open end of the ferrule 306). The tip assembly 202 further includes another ferrule-like component 310 such as a metal holder. The sapphire rod 208 is positioned within the metal holder 310, leaving a sensing end 312 of the sapphire rod 208 protruded and/or otherwise exposed to the environment. The sapphire rod 208 is bonded into the metal holder 310 with a high temperature and/or high pressure resistant bonding agent. The tip 312 of the sapphire rod 208 may be shaped or otherwise configured (e.g., polished) to desired specifications. For example, in some embodiments, the tip 312 may have a conical shape (e.g., 90 degrees) as shown, but may have other angles or facets and may have multiple angles machined onto a single tip. The sapphire rod 208 is optically coupled to the optical fiber 304 inside the pressure housing 302. The metal holder 310 with the sapphire rod 208 may be inserted and sealed into an opening or socket of the pressure housing 302 tip. There may be a sealing component, such as an O-ring 314 around the metal holder 310 to seal the pressure housing 302 from the external environment, so that everything inside the pressure housing 302 is dry. A cap 316 may be placed over the metal holder 310, securing the metal holder 310 and sapphire rod 208 in position with respect to the pressure housing 302. The cap 316 may have a securement feature such as threads or clips, among other options. In some embodiments, the sapphire rod 208 may be secured by a device or mechanism other than the cap 316. For example, the sapphire rod 208 may be secured by a clip, a vice, a tube, or any other appropriate means. In some embodiments, the ferrule 306 holding the end of the optical fiber 304 may be spring loaded via a spring mechanism 318. Thus, when the metal holder 310 is inserted into the pressure housing 302, it pushes against the spring loaded ferrule 306, and the optical fiber 304 is urged into contact with the sapphire rod 208. The optical fiber 304 and sapphire rod 208 are substantially the same diameter and precisely centered such that they become aligned when pushed together, thereby forming an optical channel. In some embodiments, there is an anti-rotation feature on or around the spring-loaded ferrule 306 to prevent rotation of the optical fiber 304.

Figure 4:
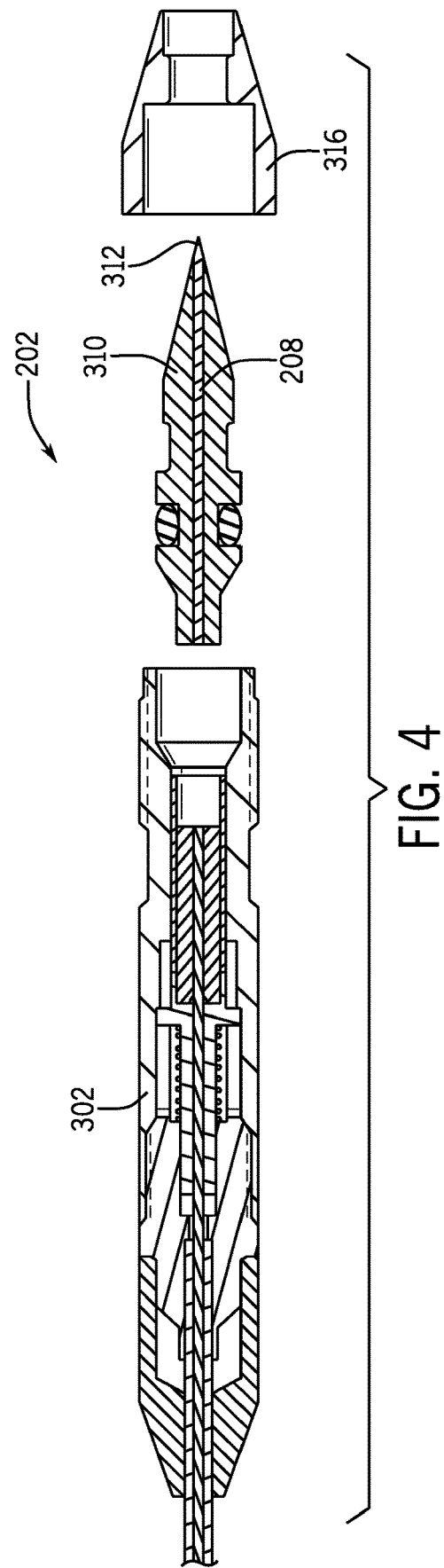
FIG. 4 illustrates a partially exploded section view of the tip assembly, emphasizing the changeability of the sapphire rod, in accordance with example embodiments.

FIG. 4 illustrates a partially exploded section view of the tip assembly 202, emphasizing the changeability of the sapphire rod 208, in accordance with example embodiments. The tip 312 of the sapphire rod 208 is directly exposed to the downhole environment. Thus, if the tip 312 becomes damaged, it will not function correctly and will need to be replaced. In present embodiments, it is no longer necessary to replace the whole sensor device 102. Present embodiments allow for the sapphire rod 208 to be replaced without replacing other portions of the sensor or tool, meaning a shorter turn-around time and reduced cost to the customer. In an alternate case, when the sensor body may be damaged without damage to the sapphire rod 208, the sapphire rod 208 may be removed, the sensor body replaced and the sapphire rod 208 fitted back into the new sensor body. In some embodiments, in order to replace the sapphire rod 208, the cap 316 may be removed, and the metal holder 310 with the sapphire rod 208 may be removed from the pressure housing 302. In some embodiments, the sapphire rod 208 is permanently bonded to the metal holder 310 so both are replaced. A new metal holder with sapphire rod may be immediately inserted into the pressure housing 302 and secured with the cap 316. In some embodiments, the sapphire rod 208 may be removed from the metal holder 310 and a new sapphire rod inserted. The new sapphire rod and original metal holder 310 can then be inserted into the pressure housing 302 and secured with the cap 316.

Figure 5:
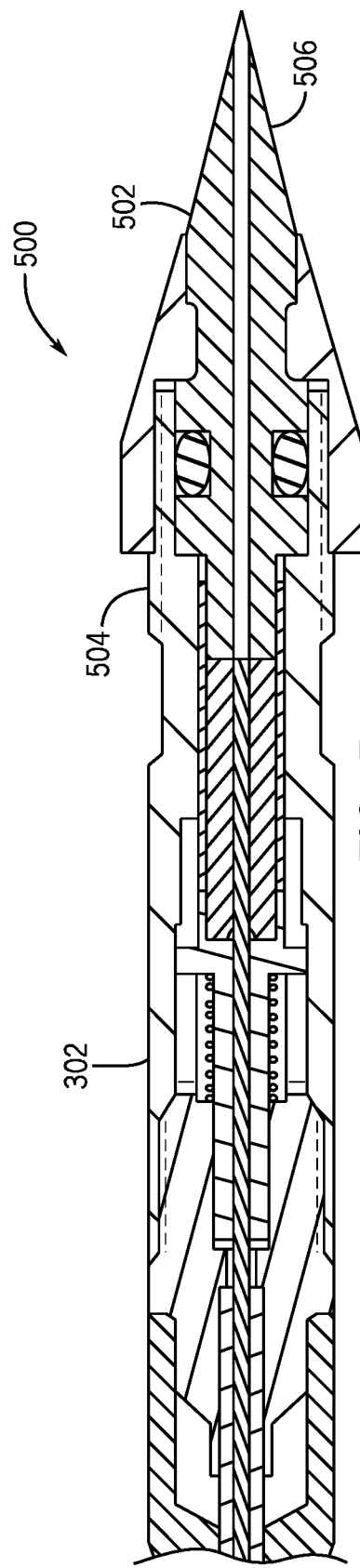
FIG. 5 illustrates another embodiment of a rod holder, which has an orthogonal contact surface for interfacing with the pressure housing, in accordance with example embodiments.

Although described herein as a metal holder 310, in other embodiments of the present disclosure, the holder 310 may be formed from any appropriate material or composite of materials. For example, in some embodiments, the holder 310 may be made of ceramic. Additionally, the holder and/or the pressure housing may take on various shapes and configurations. For example, FIG. 5 illustrates another embodiment 500 of a holder 502, which has an orthogonal contact surface 504 for interfacing with the pressure housing 302, rather than the conical configuration of the holder illustrated in FIGS. 3 and 4. As mentioned, the holder 502 and the sapphire rod 506 may be easily replaced should they be damaged or fail. Similarly, if the other regions of the sensor (e.g., pressure housing, spring mechanism, tubular body) were to be damaged or fail, and the tip was still functional, the design allows those components or group of components to be swapped out and replaced and the still functional tip can then be fitted to the repaired or replaced components and continue to be useable.

Figure 6:
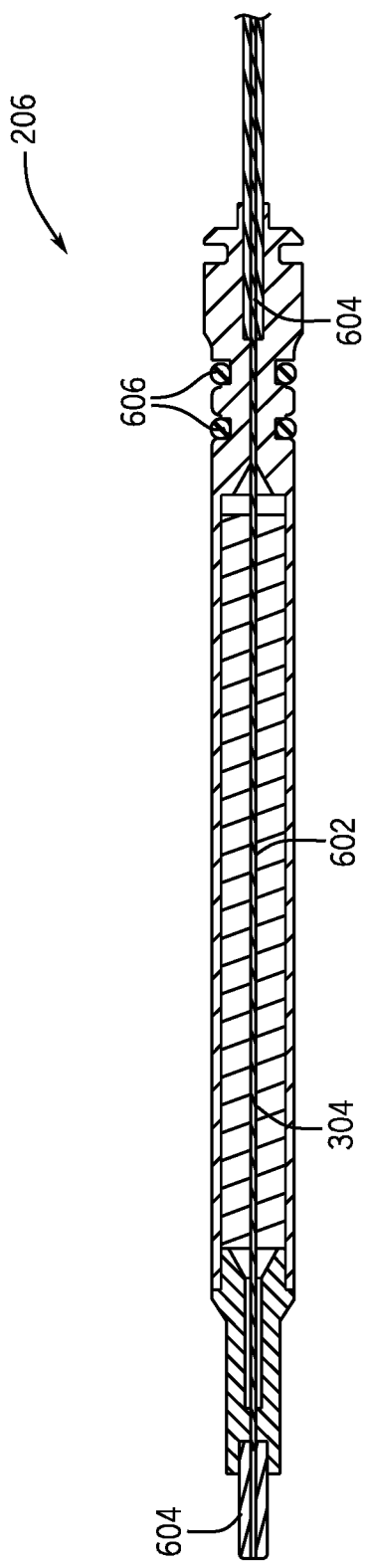
FIG. 6 illustrates a cross-sectional view of the pressure plug of the optical sensor, in accordance with example embodiments.

FIG. 6 illustrates a cross-sectional view of the pressure plug 206. As described above, the optical fiber 304 extends from the pressure housing 302 of the tip assembly 202, through the tubular body, and through the pressure plug 206 at the other end of the sensor device 102. In some embodiments, the optical fiber 304 may be given some slack to accommodate thermal expansion and sending device of the sensor 102. The pressure plug 206 includes a slack cavity 602, which provides space for the optical fiber 304 when in slack. For example, as the sensor device 102 is lowered into a downhole environment and if it remains in a wellbore as fluid flows through the wellbore, the sensor device 102 may be subject to changing temperatures and/or pressures. This may cause various portions of the sensor device 102 to expand and/or contract at times. Thus, the optical fiber 304 may sometimes be stretched and sometimes may have some slack. In some embodiments, the length of the optical fiber 304 may be designed to provide some slack when the sensor assembly 102 is at an above-ground temperature. Thus, if the sensor device 102 expands under heat or pressure, the optical fiber 304 will not be stretched or stressed. This greatly reduces thermally induced stresses in the delicate optical fiber 304 and reduces the risk of it failing. The cavity 602 also allows the optical fiber 304 to coil slightly within the sensor assembly 102, which facilitates the spring loading at the tip assembly, allowing the removable tip to be correctly coupled with the optical fiber 304. Although the optical fiber 304 is illustrated in a taught position in FIG. 6, the optical fiber may be curved (e.g., sinusoidal or coiled shape) within the slack cavity 602 or the like.

In some embodiments, there may be ferrules 604 on each side of the slack cavity 602, which attach to the optical fiber 304. The pressure plug 206 may also include one or more O-rings 606 on the outside to seal the sensor into the sensor head of the downhole tool. The second ferrule may act as a secondary pressure barrier for the tool. Specifically, if any part of the sensor becomes mechanically damaged during operation and floods with well fluid, the secondary pressure barrier can prevent the rest of the tool from being flooded. Thus, only the one affected sensor will fail, while the unaffected sensors and main tool will continue to operate normally.

In various embodiments, various instrumentation units and data collection units may be utilized that may include a digital and/or an analog system. For example, the tool that measures the spectrum and its associated analytical components may include digital and/or analog systems. Furthermore, various surface and wellbore components not illustrated for clarity may also use a variety of digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the systems and methods disclosed herein. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit) may be included in support of the various aspects discussed herein or in support of other functions beyond this disclosure.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A downhole logging tool, comprising:
a tool body;
a bulk head on the tool body
a plurality of arms radially expandable from the tool body; and
a plurality of sensor assemblies respectively coupled to and movable with the plurality of arms, an individual sensor assembly of the plurality of sensor assemblies comprising:
 a tubular body having a first end and a second end opposite the first end;
 a pressure plug coupled to the first end of the tubular body, wherein the pressure plug is coupled to the bulk head;
 a sensor tip coupled to the second end of the tubular body, wherein the sensor tip comprises an open end opposite the tubular body and an optical tip removably positioned through the open end and held in place by a removable cap, the optical tip comprising an optical rod and a rod holder, wherein the removable cap is reusable; and
 an optical fiber extending from the pressure plug, through the tubular body, and into the sensor tip where the optical fiber is optically coupled to the optical rod.

2. The downhole logging tool of claim 1, wherein the tool body houses electronic components and the bulk head provides an interface between the electronic components internal to the tool body and the plurality of sensors external to the tool body.

3. The downhole logging tool of claim 2, wherein the pressure plug is sealed against the bulk head to isolate the inside of the tool body from an environment external to the tool body.

4. The downhole logging tool of claim 2, wherein the electronic components include a light source and a detector in optical communication with the optical fiber and optical rod in the sensor assembly.

5. The downhole logging tool of claim 1, wherein the pressure plug includes a slack cavity where the optical fiber is in slack under neutral temperature and pressure conditions to withstand expansion of the sensor device under some temperature or pressure conditions.

6. The downhole logging tool of claim 1, wherein the optical rod is permanently bonded to the rod holder.

7. The downhole logging tool of claim 1, wherein the optical rod is removable from the rod holder.

8. A sensor device, comprising:
a tubular body having a first end and a second end opposite the first end;
a pressure plug on the first end of the tubular body;
a sensor tip on the second end of the tubular body, wherein the sensor tip comprises an open end opposite the tubular body and an optical tip removably positioned through the open end, the optical tip comprising an optical rod and a rod holder; and
an optical fiber extending from the pressure plug, through the tubular body, and into the sensor tip, where the optical fiber is optically coupled to the optical rod and the sensor tip is held in place by a removable cap, wherein the removable cap is reusable.

9. The sensor device of claim 8, wherein the optical rod is permanently bonded to the rod holder.

10. The sensor device of claim 8, wherein the optical rod is removable from the rod holder.

11. The sensor device of claim 8, wherein the optical rod is a sapphire rod.

12. The sensor device of claim 8, wherein the pressure plug includes a slack cavity where the optical fiber is in slack under neutral temperature and pressure conditions to withstand expansion of the sensor device under some temperature or pressure conditions.

13. The sensor device of claim 8, wherein an end of the optical fiber is held by a spring loaded ferule in the sensor tip, wherein the spring loaded ferrule maintains the optical fiber in contact with the optical rod.

14. The sensor device of claim 8, wherein a sealing component between the optical tip and the opening of the sensor tip seals the inside of the sensor tip against an external environment.

15. The sensor device of claim 8, wherein the optical rod extends beyond the rod holder and is optically coupled to an external environment.

16. A method of changing an optical tip of a sensor assembly, comprising:
removing a cap of a sensor head of the sensor assembly, wherein the optical tip is coupled to a tubular body opposite a pressure plug;
removing the optical tip from an opening in the sensor head;
inserting a new optical tip into the opening of the sensor head, wherein the new optical tip includes an optical rod and a rod holder; and
placing the cap back onto the sensor head over the new optical tip, the cap locking the new optical tip in place in the sensor head, wherein at least a portion of the optical rod extends through the cap and is optically coupled to an environment external to the sensor assembly.

17. The method of claim 16, further comprising:
removing a damaged optical rod from the rod holder; and
placing a new optical rod into the rod holder to form the new optical tip.

18. The method of claim 16, wherein the optical tip includes an optical rod permanently bonded to a rod holder, both of which are replaced by the new optical tip.

19. The method of claim 16, wherein the sensor assembly includes an optical fiber extending from the pressure plug, through the tubular body, and into the sensor head where the optical fiber is optically coupled to the optical rod.

20. The method of claim 19, wherein the pressure plug includes a slack cavity where the optical fiber is in slack under neutral temperature and pressure conditions to withstand expansion of the sensor device under some temperature or pressure conditions.

\* \* \* \* \*